United States Patent Office 2,925,241
Patented Feb. 16, 1960

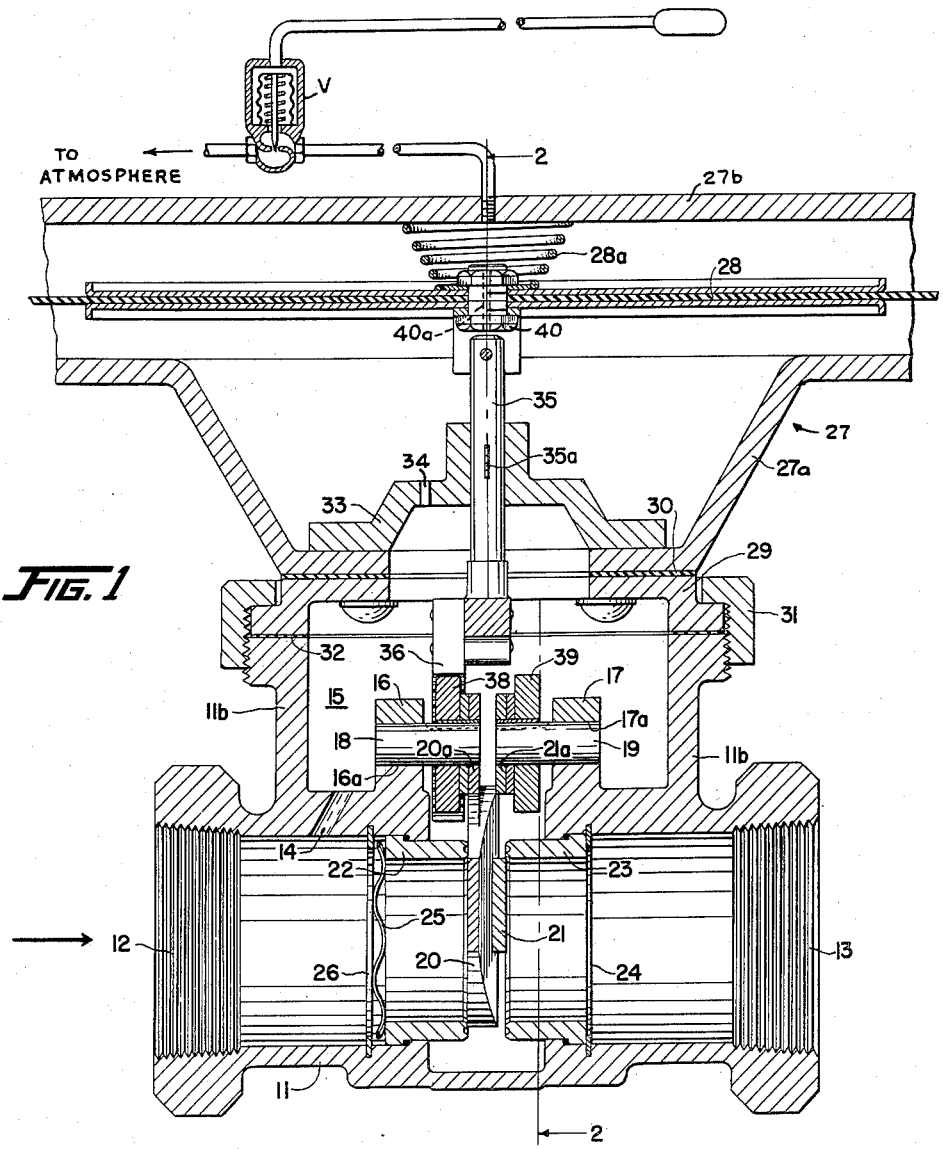

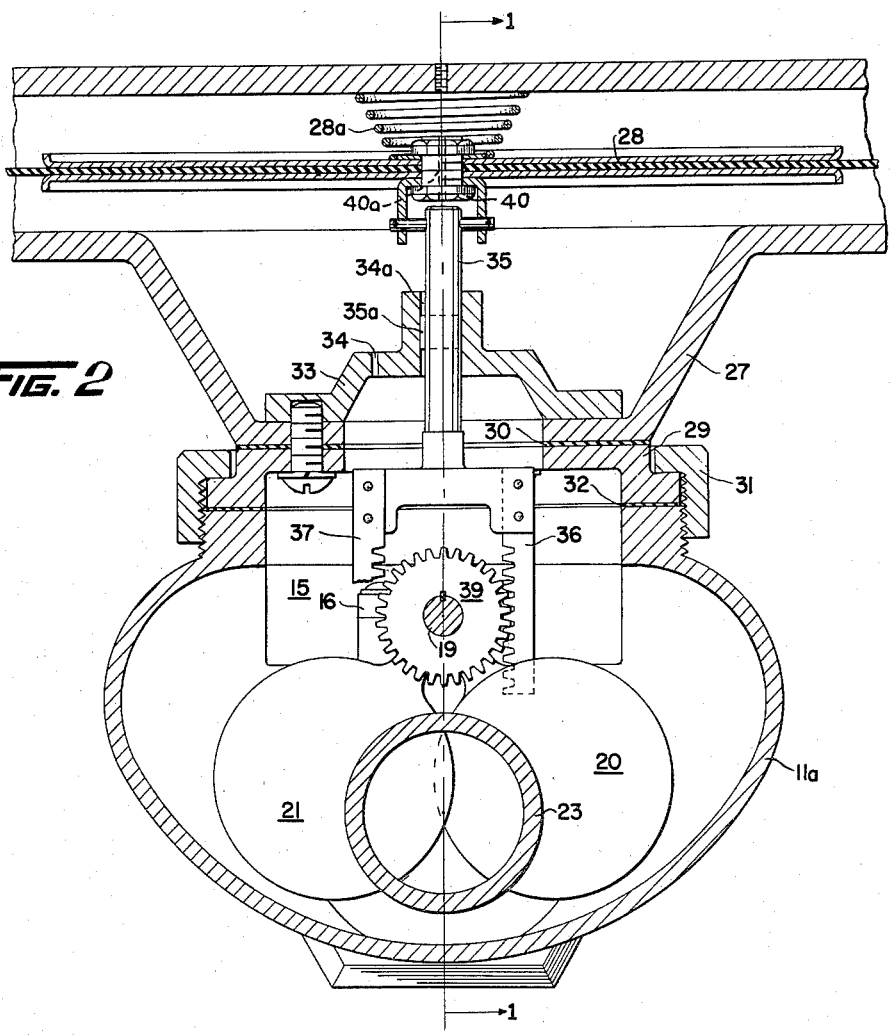

2,925,241

DIAPHRAGM OPERATED GATE VALVE

Harold R. Baldwin, Excelsior, Minn., assignor to Minneapolis-Honeywell Regulator Company, Minneapolis, Minn., a corporation of Delaware Application June 17, 1957, Serial No. 665,994

6 Claims. (Cl. 251—58)

This invention relates to valves which are particularly adapted to handle large rates of fluid flow under considerable pressure. More particularly, the invention is directed to a diaphragm operated type of valve having a straight through fluid flow passage therein.

While valves of this general type are well known in the prior art, this invention is directed to a new arrangement of valve seat, valve head and actuating means for the valve head that is adapted to be actuated by a diaphragm motor.

One of the objects of the invention is to provide a large capacity valve that provides for characterized fluid flow therethrough.

Another object of the invention is to provide a valve having a self cleaning seat.

Another object of the invention is to provide a valve having a seat or seats which are readily renewable.

Still another object of the invention is to provide a valve having wedge shaped discs co-operable with a valve seat that is resiliently biased against the discs.

A still further object of the invention is to provide a straight through flow valve having valve means which is movable completely out of alignment with the flow passage. Still another object of the invention is to provide a valve having a straight through flow passage controlled by a pair of valves discs that are movable simultaneously into and out of alignment with the flow passage.

Still further objects of the invention will become apparent upon reading the following detailed description of the invention in conjunction with the accompanying drawing, wherein:

Figure 1 is a fragmentary and vertical sectional view along the longitudinal axis of the valve; and Figure 2 is a cross sectional view of the valve taken along line 2—2 of Figure 1.

The diaphragm valve has a valve body 11 with a threaded inlet 12, a threaded outlet 13, a transversely enlarged portion 11a (Figure 2) communicating with an open-top cylindrical portion 11b. A bore 14 extends from the inlet of the valve body to a chamber 15 formed within the upper extension 11b. Two bosses 16 and 17 extend upwardly into the chamber 15 and have bearing bores 16a and 17a extending therethrough in coaxial alignment.

Shafts 18 and 19 are rotatably and axially slidable in the bore 16a and 17a respectively and carry, at the two adjacent ends thereof, disc valves 20 and 21 respectively. These valves are secured to the shafts by means of radially extending arms 20a and 21a respectively. The arms 20a and 21a are secured to their respective shafts by means of a pressed fit as well as by means of a key and slot connection. One surface of each of the valve discs is flat and at right angles to the axis of the valve body while the adjacent surfaces of the valve discs are flat but at a slight angle to the transverse axis of the valve passage or body so that when the two discs are superimposed, the narrow edge of one disk is adjacent the thick edge of the adjoining disc. It is readily seen that, with two juxtapositioned discs in the opening of the valve, a characterized pattern is imparted to the flow of any fluid passing through the resultant port. Also, two angled face discs afford a better operation than a single disc because of the ease of breakaway, thus requiring less power.

These two valve discs are positioned between two sleeve-like valve seats 22 and 23. The valve seat 23 is retained in a fixed position by having an outwardly extending annular rib thereof engaging an inwardly extending annular rib on the inlet passage, with an O-ring seal therebetween. This valve seat member is detained in this abutting relationship by means of a split ring engaging in an annular groove in the outlet passage.

The other valve seat 22 has a similar construction and is adapted to engage a similar annular rib in the inlet passage when the valve discs are moved out of engagement with each other so as to free the seat member to move toward the other seat member. The discs and valve seats are illustrated in such a position in Figures 1 and 2 of the drawing. A spring washer 25 is positioned between the outer edge of the valve seat 22 and a split ring 26 positioned in an annular groove in the inlet passage of the valve body. It is thus seen that as the two valves move toward each other, the two valve seat members are biased apart to provide a resilient sealing engagement between the discs and between the discs and the valve seats.

The power means for actuating the two valve discs consists of a conventional diaphragm power head 27 having a diaphragm 28 therein between a lower casting 27a and an upper casting 27b, which power head is bolted to a cap member 29 with a sealing washer 30 therebetween. The cap 29 is in turn clamped to the top of the valve body portion 11b by means of a ring nut 31. A washer 32 is positioned between the cap 29 and the body 11 to assure a gas tight seal. Extending upwardly into the housing 27a of the diaphragm motor is a guide bracket 33 that is secured to the head 27 by means of the same bolts that clamp the head to the cap 29. An aperture or apertures 34 through the bracket member 33, permits the flow of gas from the inlet side of the valve body into the chamber under the diaphragm 28. An orifice or bore 40a extends through the bolt 40 that clamps a backing plate to each side of the diaphragm. This orifice provides a restricted gas flow from the lower chamber to the upper chamber. The diaphragm 28 is connected to the valve discs 20 and 21 by means of a stem 35 carrying two offset and opposed gear racks 36 and 37 at its lower end which are arranged to mesh with gears 38 and 39, respectively, which are keyed to the shafts 18 and 19. It is thus seen that as the diaphragm moves upwardly and downwardly, the two racks will move upwardly and downwardly and cause pivoting of the valve discs about their respective shafts to move to open and closed positions. A key 35a, in the stem 35, slidably fits in a longitudinally extending groove 34a in the bracket 33 so as to prevent the stem from rotating and disengaging the racks from their respective gears.

The operation of the diaphragm motor is controlled through a bulb and bellows operated diaphragm controller or pilot valve V connected to the chamber over diaphragm 28 through an opening in the top of the diaphragm chamber. The pilot valve regulates the bleeding of gas to the atmosphere from the chamber above the diaphragm to cause opening and closing of the valve discs 20 and 21. When the control valve is in a position to cut off the bleeding of fluid from the top of the diaphragm, pressure will build up above the diaphragm and with the aid of the spring 28a will close the valves. When the control valve is in a position to exhaust the fluid from above the diaphragm to a low pressure area, such as to the atmosphere or to the down stream side of the discs 20 and 21, the pressure below the diaphragm will open the valves against the spring 28a. It is to be understood, however, that other power means may be used to operate the stem 35 rather than a pressure motor, such as an electrically driven motor, and still make use of the improved valve construction and actuating mechanism disclosed herein.

The preferred type of diaphragm controller for the valve mechanism of this invention is one that will modulate the position of the diaphragm and therefore the position of the disc valves between the full off and the full on positions thereof. This type of diaphragm controller is well known and usually embodies a condition responsive means for modulating the position of the control valve thereby controlling the rate of flow of fluid from above the diaphragm and thus regulate the pressure differential across the diaphragm to determine the degree of opening of the valves.

It is to be noted that as illustrated, the valve discs are in an intermediate position. This means that the pressure is such as to hold the racks in a position wherein the disks are in only a slightly overlapping relationship and the valve port only slightly open. By opening the condition responsive control valve still wider, the pressure above the diaphragm 28 becomes still less than the pressure below the diaphragm and the valve will be opened to a wider open position. In other words, the position of the valve discs will be varied in response to the change in position of the diaphragm controller. As the valve discs slide across each other and across the valve seats, they will be self cleaning and thus always assure positive seal off.

While I have described a preferred embodiment of the invention, it is deemed to be obvious that modifications may be made therein without departing from the scope of the invention. Therefore, the scope of the invention should be determined from the appending claims.

I claim:

1. A valve comprising a valve body having an inlet passage and an outlet passage and an enlarged chamber with an open top therebetween, an inwardly extending annular shoulder in each of said passages adjacent said chamber, a sleeve-like valve seat member in each of said passages and extending coaxially through the adjacent one of said annular shoulders, each of said members having an outwardly extending annular rib on the outer end thereof cooperable with said annular shoulders to limit the inward movement of said members, means in said passages for retaining said members therein and at least one of said means including means for biasing one of said members towards the other member, a pair of pivotally mounted, relatively movable, wedge shaped disc valve heads movable transversely in an arc into and out of coaxial alignment with said members, said heads bearing against each other and biasing said members further apart when said heads are substantially coaxial, and means for simultaneously actuating said heads.

2. A valve comprising a valve body having an inlet passage and an outlet passage and an enlarged chamber with an open top therebetween, an inwardly extending annular shoulder in each of said passages adjacent said chamber, a sleeve-like valve seat member in each of said passages and extending coaxially through the adjacent one of said annular shoulders, each of said members having an outwardly extending annular rib on the outer end thereof cooperable with said annular shoulders to limit the inward movement of said members, means in said passages for retaining said members therein and at least one of said means including means for biasing one of said members towards the other member, a pair of pivotally mounted, relatively movable wedge shaped valve heads movable transversely into and out of coaxial alignment with said members, said heads bearing against each other and biasing said members further apart when said heads are substantially coaxial, and means for simultaneously actuating said heads including a pair of gears each connected to one of said valve heads and a pair of power actuated racks each engaging one of said gears.

3. In a valve the combination comprising a valve body having aligned inlet and outlet passages, a sleeve-like valve seat member in each of said passages, means in each of said passages for retaining said members therein and at least one of said means including means for biasing one of said member towards the other member, a pair of pivotally mounted, relatively movable wedge shaped valve heads movable transversely in an arc into and out of coaxial alignment with said members, said heads bearing against each other and biasing said members further apart when said heads are substantially coaxial, and means for simultaneously actuating said heads.

4. In a power actuated valve, the combination comprising a valve body having an inlet and an outlet with a pair of opposed valve seats therebetween with one of said seats being resiliently biased towards the other, a pair of wedge-shaped valve discs positioned between said seats, each of said discs being secured to a separate shaft having a gear thereon, each of said shafts being rotatably and axially mounted in said valve body, a pair of reciprocally mounted racks on opposite sides of said gears, each rack engaging an adjacent gear, and means for simultaneously actuating said racks to move said discs into and out of coaxial alignment with said valve seats, said means being capable of holding said discs in various intermediate positions to provide characterized fluid flow through the valve body.

5. A power actuated valve comprising a valve body having an inlet and an outlet with a valve seat therebetween, a pair of wedge-shaped valve discs positioned adjacent each other and adjacent said seat, each of said discs having a gear thereon, each of said gears being pivotally mounted in said valve body, a pair of reciprocally mounted racks on opposite sides of said gears for cooperation therewith, and power means for simultaneously actuating said racks to move said discs into and out of coaxial alignment with said valve seat, said power means being movable to a plurality of positions for holding said discs in various intermediate positions to provide characterized fluid flow through the valve body.

6. In a power actuated valve, the combination comprising a valve body having an inlet and an outlet with a valve seat therebetween, a pair of wedge shaped valve discs positioned adjacent said seat, each of said discs being secured to a separate shaft having a gear thereon, resilient means biasing one of said discs against the other when coaxially aligned, each of said shafts being rotatable and axially slidable in said valve body, a pair of reciprocally mounted racks on opposite sides of said gears for cooperation therewith, and means for simultaneously actuating said racks to move said discs into and out of coaxial alignment with said valve seats, said means being capable of holding said discs in various intermediate positions to provide characterized fluid flow through the valve body.

References Cited in the file of this patent

UNITED STATES PATENTS

| 671,441 | Jennings | Apr. 9, 1901 |
| 2,159,540 | MacClatchie | May 23, 1939 |
| 2,217,216 | Davis | Oct. 8, 1940 |
| 2,235,612 | Graney | Mar. 18, 1941 |
| 2,533,931 | Hartley | Dec. 12, 1950 |
| 2,701,117 | Bashark | Feb. 1, 1955 |

FOREIGN PATENTS

| 8,924 | Great Britain | June 13, 1884 |